United States Patent
Kobori et al.

(10) Patent No.: US 8,522,519 B2
(45) Date of Patent: Sep. 3, 2013

(54) LAWN MOWER

(75) Inventors: Kenji Kobori, Ibaraki (JP); Hiroto Inagawa, Ibaraki (JP); Tomomasa Nishikawa, Ibaraki (JP)

(73) Assignee: Hitachi Koko Co., Ltd., Tokyo (JP)

( * ) Notice: Subject to any disclaimer, the term of this patent is extended or adjusted under 35 U.S.C. 154(b) by 0 days.

(21) Appl. No.: 13/233,454

(22) Filed: Sep. 15, 2011

(65) Prior Publication Data

US 2012/0073256 A1 Mar. 29, 2012

(30) Foreign Application Priority Data

Sep. 27, 2010 (JP) ................................. 2010-216254

(51) Int. Cl.
*A01D 34/52* (2006.01)

(52) U.S. Cl.
USPC .................................. 56/255; 56/17.1; 56/295

(58) Field of Classification Search
USPC .................................. 56/17.5, 255, 295, 17.1
See application file for complete search history.

(56) References Cited

U.S. PATENT DOCUMENTS

| | | | | |
|---|---|---|---|---|
| 1,797,028 A | * | 3/1931 | Snyder | 30/228 |
| 2,172,786 A | * | 9/1939 | Bishir | 56/238 |
| 2,232,261 A | * | 2/1941 | Orr | 56/17.4 |
| 2,259,676 A | * | 10/1941 | Winchell | 56/17.3 |
| 2,484,201 A | * | 10/1949 | Winchell | 56/17.1 |
| 2,485,729 A | * | 10/1949 | Gentry | 56/17.2 |
| 2,782,584 A | * | 2/1957 | Lokey | 56/16.7 |
| 3,774,379 A | | 11/1973 | Mizobata et al. | |
| 4,520,619 A | | 6/1985 | Doi et al. | |
| 4,706,446 A | | 11/1987 | Doi et al. | |
| 6,701,698 B1 | * | 3/2004 | Nwosu et al. | 56/16.4 D |
| 7,458,161 B2 | * | 12/2008 | Wilson | 30/276 |

FOREIGN PATENT DOCUMENTS

| | | |
|---|---|---|
| EP | 0 433 647 A1 | 6/1991 |
| GB | 345652 | 3/1931 |
| GB | 1240277 | 7/1971 |
| JP | 59-059113 A | 4/1984 |
| JP | 2007-295864 A | 11/2007 |
| JP | 2011-211967 A | 10/2011 |

OTHER PUBLICATIONS

Great Britain Search Report issued in Great Britain Patent Application No. 1115890.4, dated Jan. 11, 2012.

* cited by examiner

*Primary Examiner* — Alicia Torres
(74) *Attorney, Agent, or Firm* — McDermott Will & Emery LLP

(57) ABSTRACT

A lawn mower comprising: a power supply; a chassis for holding the power supply; a fixed shaft attached to the chassis; a rotary blade which is rotatably supported with respect to the fixed shaft; a transmitting portion which transmits rotation of the power supply to the rotary blade; and a fixed blade which is coaxially-arranged with the rotary blade, wherein a distance between the rotary blade and the fixed blade can be varied.

5 Claims, 9 Drawing Sheets

LAWN MOWER

CROSS-REFERENCE TO RELATED APPLICATIONS

This application claims priority from Japanese Patent Application No. 2010-216254 filed on Sep. 27, 2010, the entire contents of which are incorporated herein by reference.

TECHNICAL FIELD

Aspects of the present invention relate to a lawn mower for mowing lawn by actuating a rotary blade with a power of a motor or the like, and more particularly, to a lawn mower having a low noise driving mode.

BACKGROUND

A sectional view of a related-art lawn mower 101 is shown in FIG. 9. A motor 112 is fixed to a chassis 102, which is a basic framework of the lawn mower 101, in such a manner that a rotation shaft of the motor is positioned in a vertical direction. By transmitting the power of the motor 112, a rotary blade 122 is rotated. A fixed blade 124 which is fixed to a lower end of a fixed shaft 118 is positioned below the rotary blade 122. A pinion is fixed to an output shaft 112a of the motor 112, and by transmitting a rotation force of this pinion to a gear 116, a fitting member 120 which is connected to a lower side of the gear 116 is rotated. The fitting member 120 is held so as to rotate around the fixed shaft 118, and is pressed downward by a spring 127, and accordingly, the rotary blade 122 is constantly urged toward the fixed blade 124. When the rotary blade 122 is rotated, lawn is mown by a combination of the rotary blade 122 and the fixed blade 124. Such structure of the lawn mower 101 is disclosed, for example, in JP-A-S59-59113.

In the related-art lawn mower 101, a large noise occurs when the rotary blade 122 and the fixed blade 124 are rubbed against each other. At the same time, vibration which occurred from the rubbing between the rotary blade 122 and the fixed blade 124 is transmitted to the chassis 102 and a body cover 103, by way of the rotary blade 122 and the fixed shaft 118. As a result, the chassis 102 and the body cover 103 are vibrated, and a large noise may occur, due to the vibration of the chassis 102 and the body cover 103.

SUMMARY

The invention has been made in view of the above-described background, and an object of the invention is to provide a lawn mower in which operating noises can be decreased by a simple structure.

Another object of the invention is to provide a lawn mower which has a low noise driving mode, by making setting positions of a rotary blade and a fixed blade variable.

Still another object of the invention is to provide a lawn mower in which the setting positions of the rotary blade and the fixed blade can be easily varied by a worker, by operating a lever.

According to an aspect of the invention, there is provided a lawn mower comprising: a power supply; a chassis for holding the power supply; a fixed shaft attached to the chassis; a rotary blade which is rotatably supported with respect to the fixed shaft; a transmitting portion which transmits rotation of the power supply to the rotary blade; and a fixed blade which is coaxially-arranged with the rotary blade, wherein a distance between the rotary blade and the fixed blade can be varied.

DETAILED DESCRIPTION

[Exemplary Embodiment 1]

Figure 1:
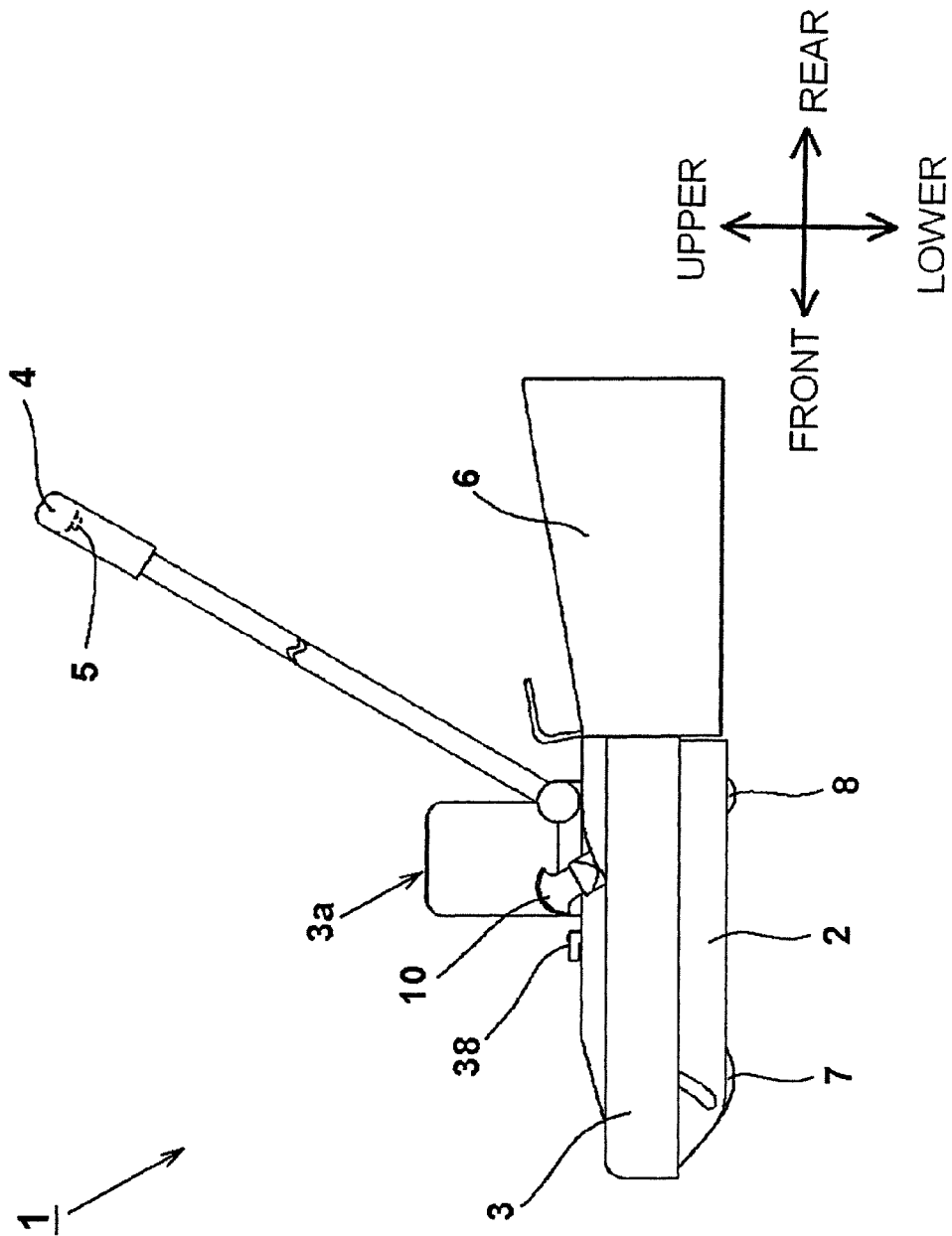
FIG. 1 is a side view of a lawn mower 1 in an exemplary embodiment of the invention.

Now, an exemplary embodiment of the invention will be described by referring to the drawings. It is to be noted that in the attached drawings, same members are denoted with same reference numerals, and repetitive descriptions are omitted. Moreover, in the specification, front and back, right and left, and upper and lower directions are described as being the same as the directions shown in FIGS. 1 and 2.

FIG. 1 is a side view of a lawn mower 1 in an exemplary embodiment of the invention. The lawn mower 1 includes a chassis 2 which constitutes a basic framework for holding various structural components. A body cover 3 is fixed to an upper part of the chassis 2. A handle part 4 is attached to a back side of the chassis 2 so as to be rotated within a determined range with respect to the body cover 3. The handle part 4 is grasped by a worker for operating the lawn mower 1 to be pushed forward or pulled backward. The handle part 4 is provided with a switch mechanism 5 to which a power supply cable, which is not shown, to be connected to a business power supply having AC 100V or so is connected.

A grass collecting bag 6 for stocking lawn which has been mown is detachably attached to a back side of the body cover 3. Although a device for mowing grass is described as the lawn mower 1 in this exemplary embodiment, an object to be mown is not limited to "the lawn", but is also possible to mow other grass than the lawn. The grass collecting bag 6 is a bag made of cloth, for example, and constructed in such a manner that the grass which has been mown and swirled with an air blown from an air blowing fan, which will be described later, is introduced to an interior of the bag, and only the air is passed through the cloth, allowing only the grass to be stocked inside. The lawn mower 1 can be moved by the worker pushing the handle part 4 forward or pulls it backward. For facilitating this movement of the lawn mower 1, the chassis 2 is provided, at its lower side, with wheels 7 which are independently attached to both right and left sides of its front part, and a roller 8 in a cylindrical shape which is attached to its back part.

A cylindrical part 3a for accommodating a motor, which will be described later, is formed in an upper part of the body cover 3. A mowing height regulating member 10 for regulating the mowing height by changing a distance between the ground and a fixed blade, which will be described later, is provided near the cylindrical part 3a. In front of the cylindrical part 3a, an operating part (a positioning portion for positioning a rotary blade) 38, which is a characteristic structure of this exemplary embodiment, is provided (its details will be described later).

Figure 2:
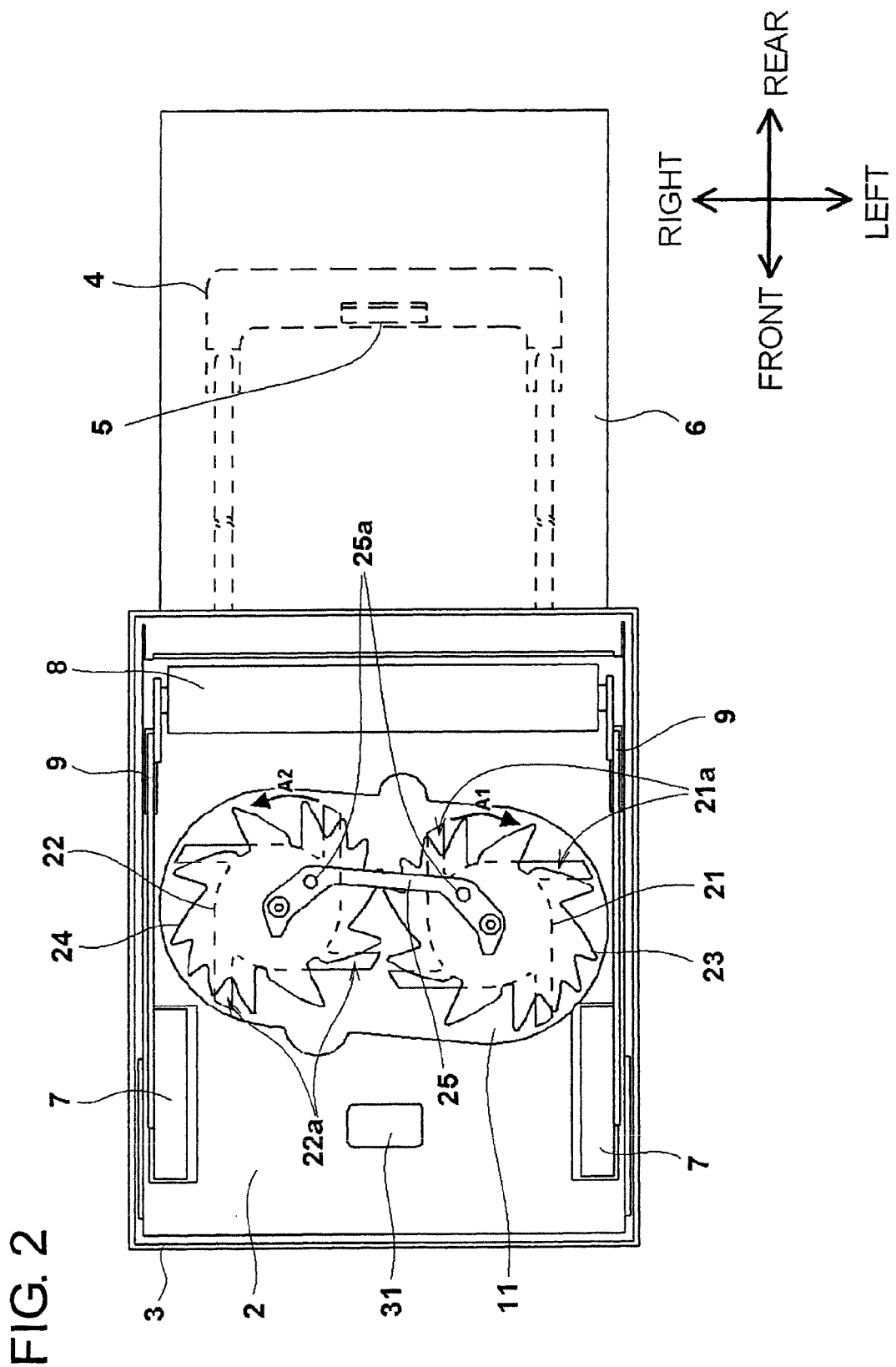
FIG. 2 is a bottom view of the lawn mower 1 in the exemplary embodiment of the invention.

FIG. 2 is a bottom view of the lawn mower 1 to which the invention is applied, as seen from below. The lawn mower 1 in this exemplary embodiment is provided with two pairs of the rotary blade, to be horizontally rotated for cutting lawn or grass, and the fixed blade. These pairs of the rotary blade and the fixed blade are arranged in parallel with each other in a lateral direction (in a right and left direction) below a gear cover 11 in a lower part of the chassis 2. Meanwhile, lawn mowers having a small mowing width, which include only one pair of the rotary blade, to be horizontally rotated, and the fixed blade, are also known. The invention can be applied to either type of the lawn mowers in the same manner.

As the blades for cutting the lawn or grass, a first pair of the rotary blade and the fixed blade is configured by a first rotary blade 21 and a first fixed blade 23 which is positioned below the first rotary blade 21, and a second pair of the rotary blade and the fixed blade is configured by a second rotary blade 22 and a second fixed blade 24 which is positioned below the second rotary blade 22. The first rotary blade 21 rotates in a direction of an arrow mark A1, and the second rotary blade 22 rotates in a direction of an arrow mark A2. The blade part employed in the lawn mower 1 of this exemplary embodiment is configured so as to cut the grass with the rotary blade and the fixed blade like a scissors, thereby cutting the grass. Therefore, it is possible to rapidly mow the lawn or grass, and to cut the lawn or grass horizontally and by and beautiful finish. Moreover, because it is possible to cut the grass with a relatively smaller rotation number of the rotary blade, there is less possibility that stones or the like in the lawn may be violently scattered.

In the lawn mower 1 in this exemplary embodiment, the first rotary blade 21 and the second rotary blade 22 are driven by using a single power supply (a motor 12). For this purpose, the first rotary blade 21 and the second rotary blade 22 are configured to rotate at the same speed in opposite directions from each other. The first rotary blade 21 and the first fixed blade 23, and the second rotary blade 22 and the second fixed blade 24 are disposed below the gear cover 11 which is fixed to a top plate of the chassis 2. In this exemplary embodiment, attaching positions of the first fixed blade 23 and the second fixed blade 24 are determined so that the first fixed blade 23 and the second fixed blade 24 may be separated from the ground by a determined distance, when the lawn mower 1 moves on the lawn or the like.

Each of the first rotary blade 21 and the second rotary blade 22 is configured such that four edge parts 21a, 22a project from a disc-like part in a round shape in a tangential direction. Moreover, the second rotary blade 22 is formed in symmetry with the first rotary blade 21, and the second fixed blade 23 is formed in symmetry with the second fixed blade 24. The first rotary blade 21 and the second rotary blade 22 are arranged in such a manner that the outermost excursions of their rotating edges overlap with each other. However, because the first rotary blade 21 and the second rotary blade 22 are synchronously rotated by the motor which is the single power supply, positions of the respective four edges 21a, 22a of the first rotary blade 21 and the second rotary blade 22 are determined so as not to contact with each other. Lower parts of axes of the first rotary blade 21 and the first fixed blade 23, and lower parts of axes of the second rotary blade 22 and the second fixed part 24 are connected by a fixed blade holding member 25, and held such that the respective shaft centers are not displaced. Moreover, the first fixed blade 23 and the second fixed blade 24 are also fixed by the fixed blade holding member 25 with rivets 25a.

The wheels 7 and the roller 8 are fixed to the chassis 2 by way of link mechanisms 9. The link mechanisms 9 can change protruding heights of the wheels 7 and the roller 8 protruding downward from the chassis 2, for the purpose of varying the distance from the first and second pairs of the rotary blade and the fixed blade to the ground. The positions of the link mechanisms 9 are varied by operating the mowing height regulating member 10 (See FIG. 1) which is provided on the body cover 3. When the worker operates the mowing height regulating member 10 in this manner, the heights of the wheels 7 and the roller 8 are changed by motions of the link mechanisms 9, and it is possible to set a desired mowing height of about 1 to a few centimeters, for example. An air blowing hole 31 is formed in front of the first and second pairs of the rotary blade and the fixed blade, and the air from the air blowing fan provided on an upper face side of the chassis 2, which will be described later, is supplied to a lower face side of the chassis 2 through the air blowing hole 31, for the purpose of blowing the air to the grass which has been mown. Although a lower fan housing is provided around the air blowing hole 31, FIG. 2 shows a state where the lower fan housing is removed.

Figure 3:
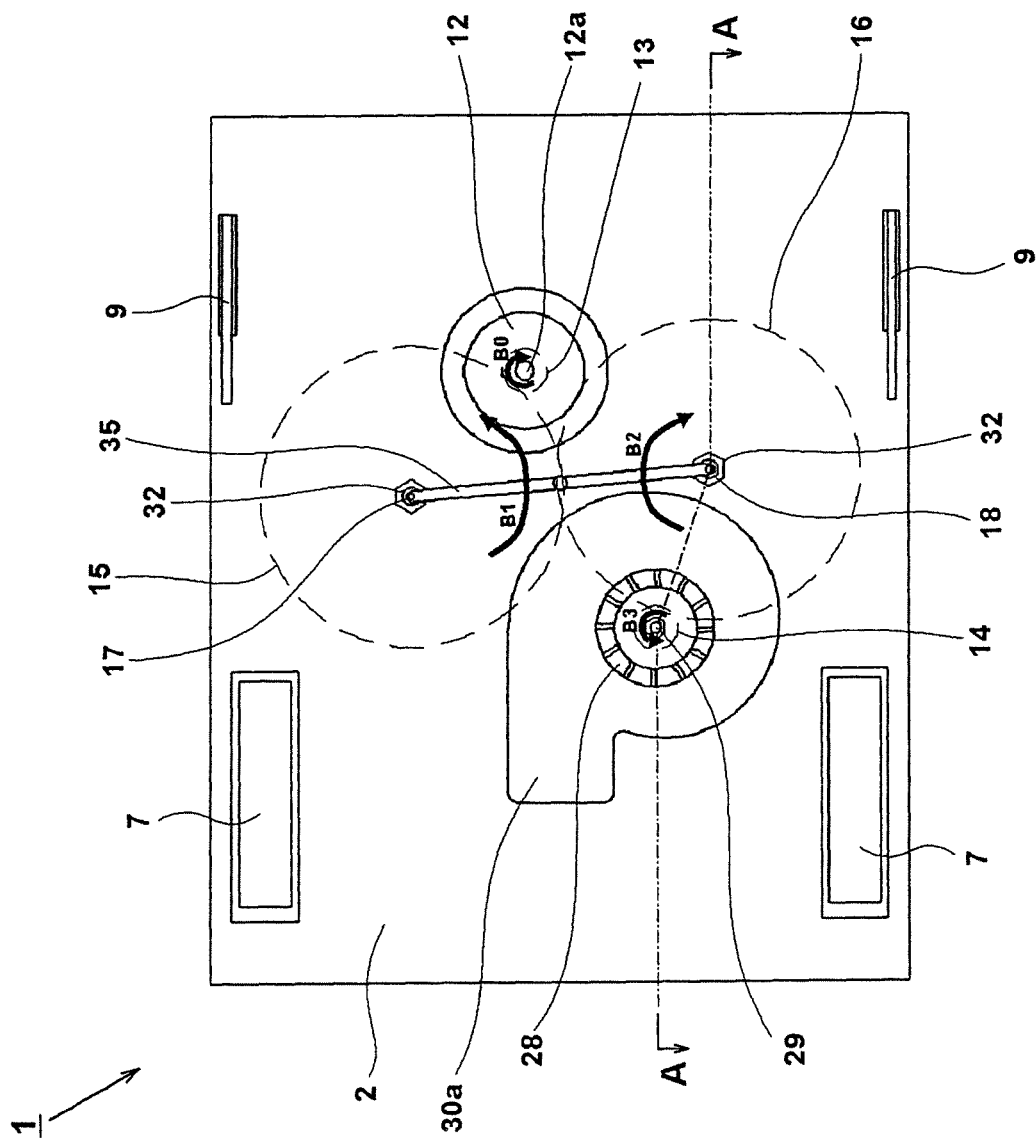
FIG. 3 is a plan view showing a part of the lawn mower 1 in the exemplary embodiment of the invention, in a state where a body cover 3 is removed.

FIG. 3 is a plan view showing the lawn mower 1 in a state where the body cover 3 is removed. The motor 12 as the power supply, which is fixed to the chassis 2, is provided with an output shaft 12a for outputting its rotation driving force. The output shaft 12a is passed through the chassis 2 from upper to lower, and a first pinion 13 is fixed to the lower side of the chassis 2. When the motor 12 is driven, the first pinion 13 is rotated in a direction of an arrow mark B0. The first pinion 13 is meshed with a first gear 15, and the first gear 15 is rotated in a direction of an arrow mark B1 with the rotation of the first pinion 13. The first gear 15 is a spur gear formed of high polymer resin, for example. The first gear 15 is meshed with the first pinion 13 in a part, and also meshed with a second gear 16 in another part. The first gear 15 and the second gear 16 are respectively supported so as to rotate around a first fixed shaft 17 and a second fixed shaft 18 which are respectively fixed to the chassis 2. In FIG. 3, circles of teeth tips of the first gear 15 and the second gear 16 are shown by dotted lines. The second gear 16 is formed of the same material and in the same shape as the first gear 15. When the first gear 15 rotates, the second gear 16 rotates in a direction of an arrow mark B2, that is, the opposite direction to the rotation direction of the first gear 15, at a same speed as the first gear 15. The first fixed shaft 17 of the first gear 15 and the second fixed shaft 18 of the second gear 16 are respectively connected to the first rotary blade 21 and the second rotary blade 22 thereby to rotate the rotary blades 21, 22 at the same speed.

The second gear 16 is meshed with the first gear 15, and at the same time, meshed with the second pinion 14. The second pinion 14 is connected to a rotation shaft 29 of an air blowing fan 28. By rotating the second pinion 14, the air blowing fan 28 is rotated with a determined rotation number. In this manner, by operating the single motor 12 in this exemplary embodiment, the first rotary blade 21 and the second rotary blade 22 are driven, and at the same time, the air blowing fan 28 is also driven. The air blowing fan 28 is provided with an upper fan housing 30a for defining an air passage, and an outlet of the air passage is connected to the air blowing hole 31 (See FIG. 2).

Figure 4:
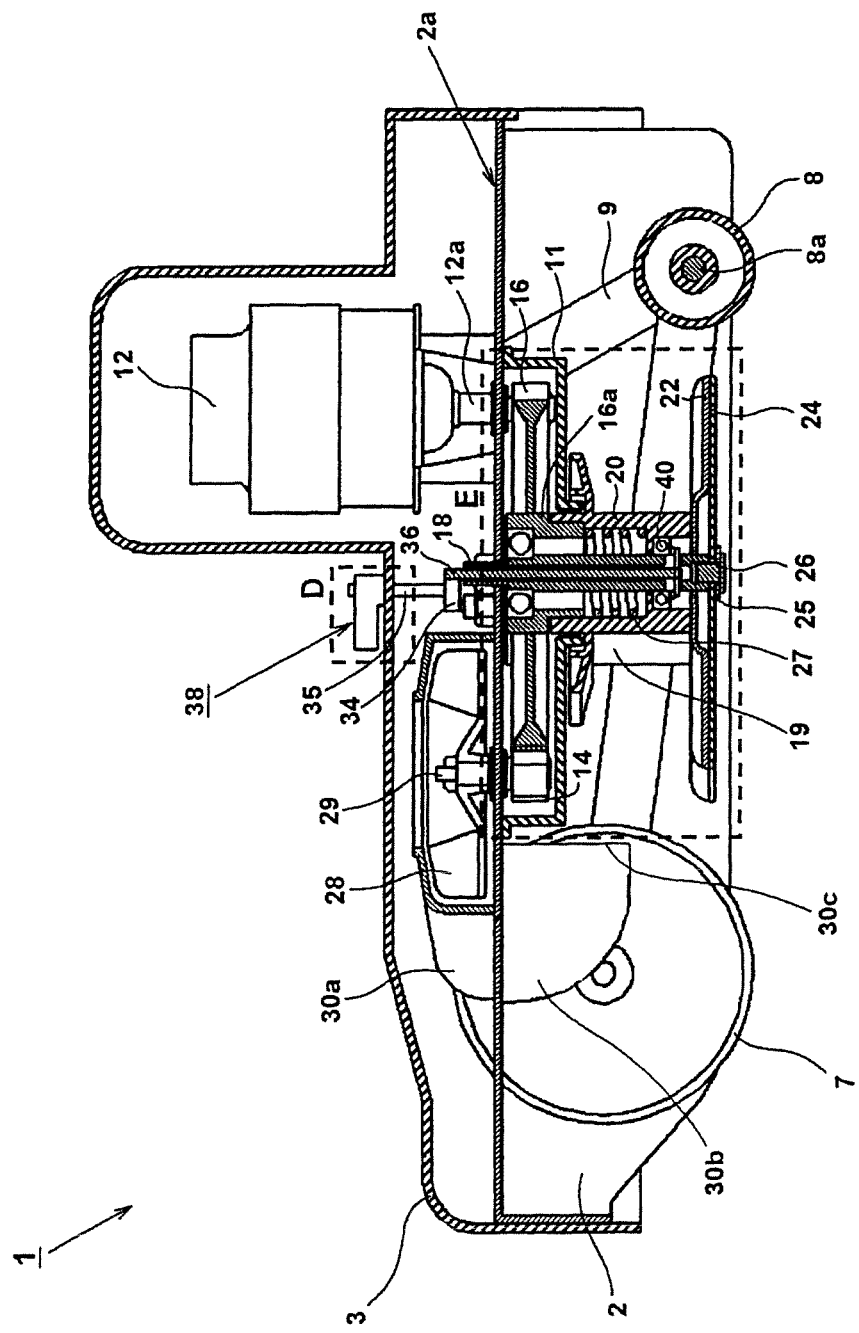
FIG. 4 is a sectional view taken along a line A-A in FIG. 3.

FIG. 4 shows a sectional view of the lawn mower 1 (taken along a line A-A in FIG. 3). The motor 12 is fixed to an upper face of the top plate 2a of the chassis 2, and the output shaft 12a of the motor 12 extends downward through to penetrate the top plate 2a. The first gear 15 (See FIG. 3) and the second gear 16, which are driven by the motor 12, are disposed below the top plate 2a and covered with the gear cover 11. The gear cover 11 is a cover for protecting the first pinion 13 (See FIG. 3), the first gear 15 (See FIG. 3), the second gear 16 and the second pinion 14, which are contained therein, from the grass which has been mown and dust. A first rotation shaft 19 and a second rotation shaft 20 which are contained in the gear cover 11 are respectively supported by the first fixed shaft 17 (See FIG. 3) and the second fixed shaft 18 so as to rotate, and rotated integrally with the first gear 15 (See FIG. 3) and the second gear 16.

Underneath the gear cover 11, the second rotation shaft 20 is fixed to the second fixed shaft 18, and the second rotary blade 22 is fixed to the second rotation shaft 20. In the same manner, the first rotation shaft 19 is fixed to the first fixed shaft 17 (See FIG. 2), and the first rotary blade 21 (See FIG. 2) is fixed to the first rotation shaft 19. On the other hand, underneath the first fixed shaft 17 (See FIG. 2) and the second fixed shaft 18, the first fixed blade 23 (See FIG. 2) and the second fixed blade 24 are respectively disposed. The first rotary blade 21 (See FIG. 2) and the first fixed blade 23 (See FIG. 2), and the second rotary blade 22 and the second fixed blade 24 are coaxially positioned so as to overlap with each other.

The top plate 2a is formed with a through hole coaxially with the rotation center of the second gear 16, and the second fixed shaft 18 in a cylindrical shape is provided so as to extend through the through hole from above to below of the top plate 2a. The second fixed shaft 18 is connected to an engaging part 16a of the second gear 16 via a bearing, and the second rotation shaft 20 is rotated with the rotation of the second gear 16. The second rotation shaft 20 is attached to a lower part of the engaging part 16a of the second gear 16. The second rotary blade 22 is fixed to a lower end of the second rotation shaft 20. The engaging part 16a and the second rotation shaft 20 are engaged with each other via an elastic member in such a manner that relative rotation is restrained by a spline groove or the like, but relative movement in an axial direction is permitted. In this exemplary embodiment, a spring 27 is disposed in a contracted state between them. The spring 27 presses the second rotary blade 22 downward so that the second rotary blade 22 and the second fixed blade 24 may be constantly rubbed against each other.

A second rod 36 is disposed in an axial direction inside the second fixed shaft 18. The second rod 36 is a non-rotatable member, and its lower end is connected to a bearing 41 which is positioned on an inner periphery of the second rotation shaft 20 (its detailed structure will be described later). When the worker operates the operating part 38, the second rod 36 can be moved in the vertical direction (axial direction), and the position of the second rotary blade 22 relative to the second fixed blade 24 is varied in correspondence with the vertical movement of the second rod 36.

The top plate 2a of the chassis 2 is further provided with a through hole, and a rotation shaft 29 is disposed so as to extend from lower to upper through the top plate 2a. The rotation shaft 29 is rotatably supported with respect to the chassis 2, and the air blowing fan 28 is fixed to an upper part of the rotation shaft 29. The second pinion 14 is fixed to a lower part of the rotation shaft 29. The air blowing fan 28 is accommodated by the upper fan housing 30a for defining the air passage. Underneath the top plate of the chassis 2, a lower fan housing 30b, which defines the air passage and realizes a rectifying action for blowing the air to the grass which has been mown, is provided.

The positioning portion for positioning the second rotary blade 22 is mainly configured by the operating part 38, a holder 34, and the second rod 36. It is to be noted that the structure at a side of the first rotary blade 21 is the same as the structure at a side of the second rotary blade 22. The holder 34 connects the second rod 36 to a first rod (not shown) which penetrates through the first fixed shaft 17, and by moving the single holder shaft 35, the first rod (not shown) and the second rod 36 can be simultaneously moved in the vertical direction. Although only the attaching structure at the side of the second rotary blade 22 and the second fixed blade 24 is shown in FIG. 4, because of the position in a sectional view (taken along the line A-A in FIG. 3), the attaching structure at the side of the first rotary blade 21 and the first fixed blade 23 is the same as the attaching structure at the side of the second rotary blade 22 and the second fixed blade 24. Therefore, in this exemplary embodiment, movements of the rotary blades will be described, referring to the side of the second rotary blade 22.

The second rod 36 for moving the second rotary blade 22 in the axial direction (up and down direction) is inserted into the second fixed shaft 18, which is hollow. The second rod 36 which is inserted into the second fixed shaft 18 is fixed to the holder 34, and the holder shaft 35 is fixed to the holder 34. The holder shaft 35 is provided with the operating part 38 for moving the rotary blade.

Figure 5:
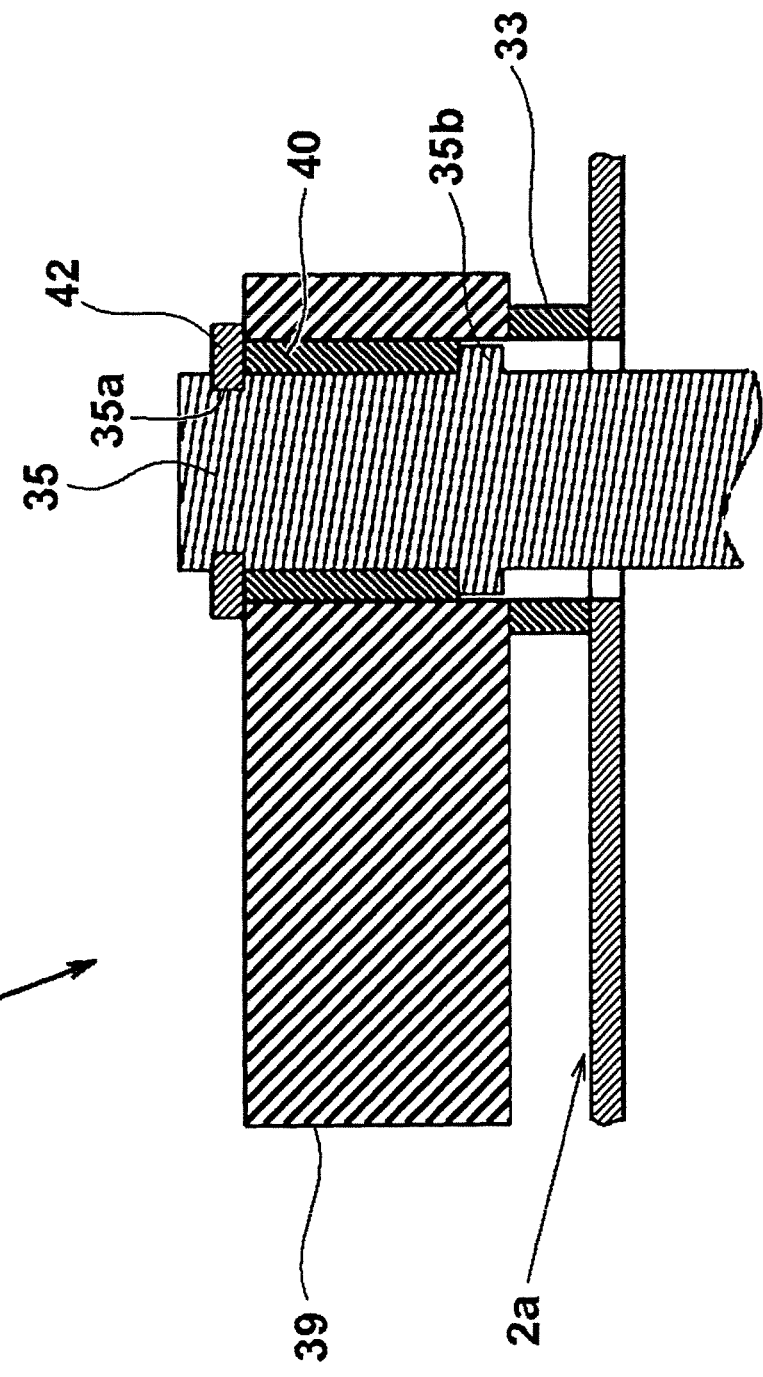
FIG. 5 is an enlarged sectional view of a region D which surrounds an operating part 38 by a dotted line in FIG. 4.

Next, referring to FIGS. 5 and 6, a shape of an upper end part of the operating part 38 (a region D, which is surrounded by a dotted line, in FIG. 4) will be described. FIG. 5 is an enlarged sectional view showing the region peripheral to the operating part 38. The upper end part of the operating part 38 mainly includes an operating lever 39 which is manually operated by the worker, and a connector 40 for connecting the operating lever 39 to the holder shaft 35. The holder shaft 35 is passed through the top plate 2a of the chassis 2 from lower to upper, and the connector 40 is inserted into the holder shaft 35. A retaining ring 42 for preventing detach of the connector 40 is fitted to a groove 35a in the holder shaft 35. Further, the holder shaft 35 is provided with a stepped part 35c having a larger outer diameter for holding a lower face of the connector 40. A lower face of the stepped part 35c is held by a spacer 33 which is provided to the upper face of the top plate 2a of the chassis 2 so that the operating lever 39 may be kept at a determined distance from the top plate 2a.

Figure 6:
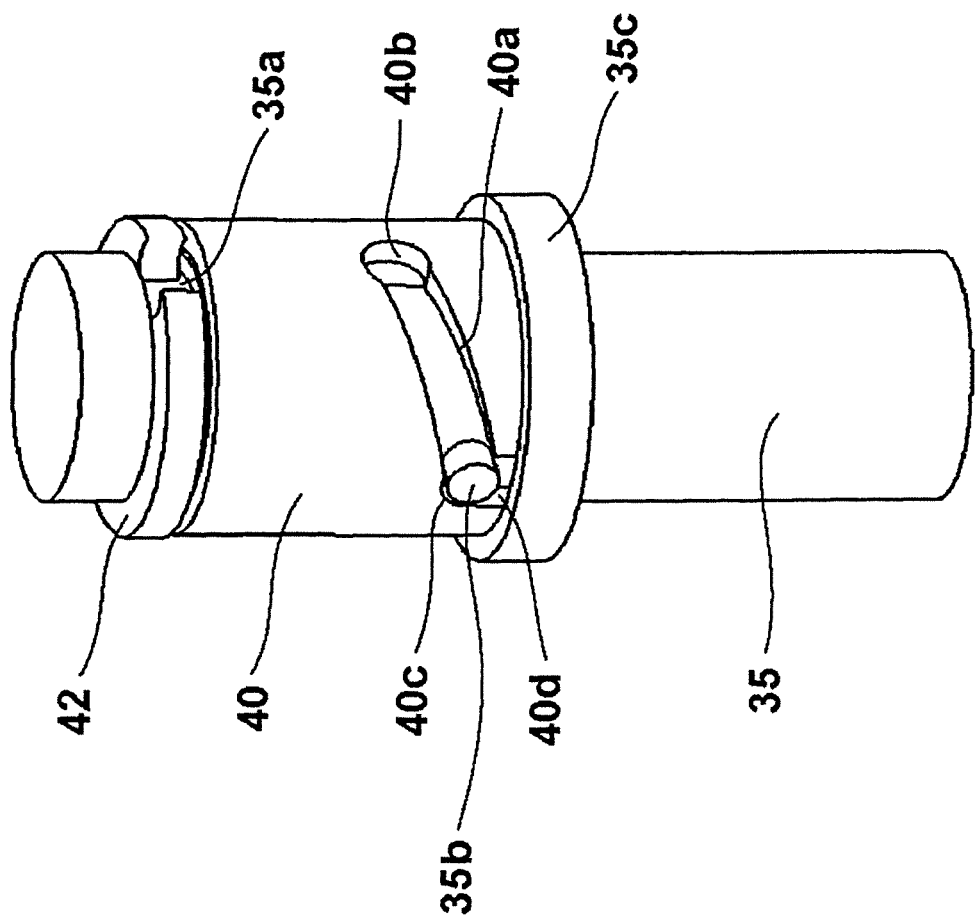
FIG. 6 is a perspective view showing an attaching structure between a holder shaft 35 and a connector 40.
Figure 7:
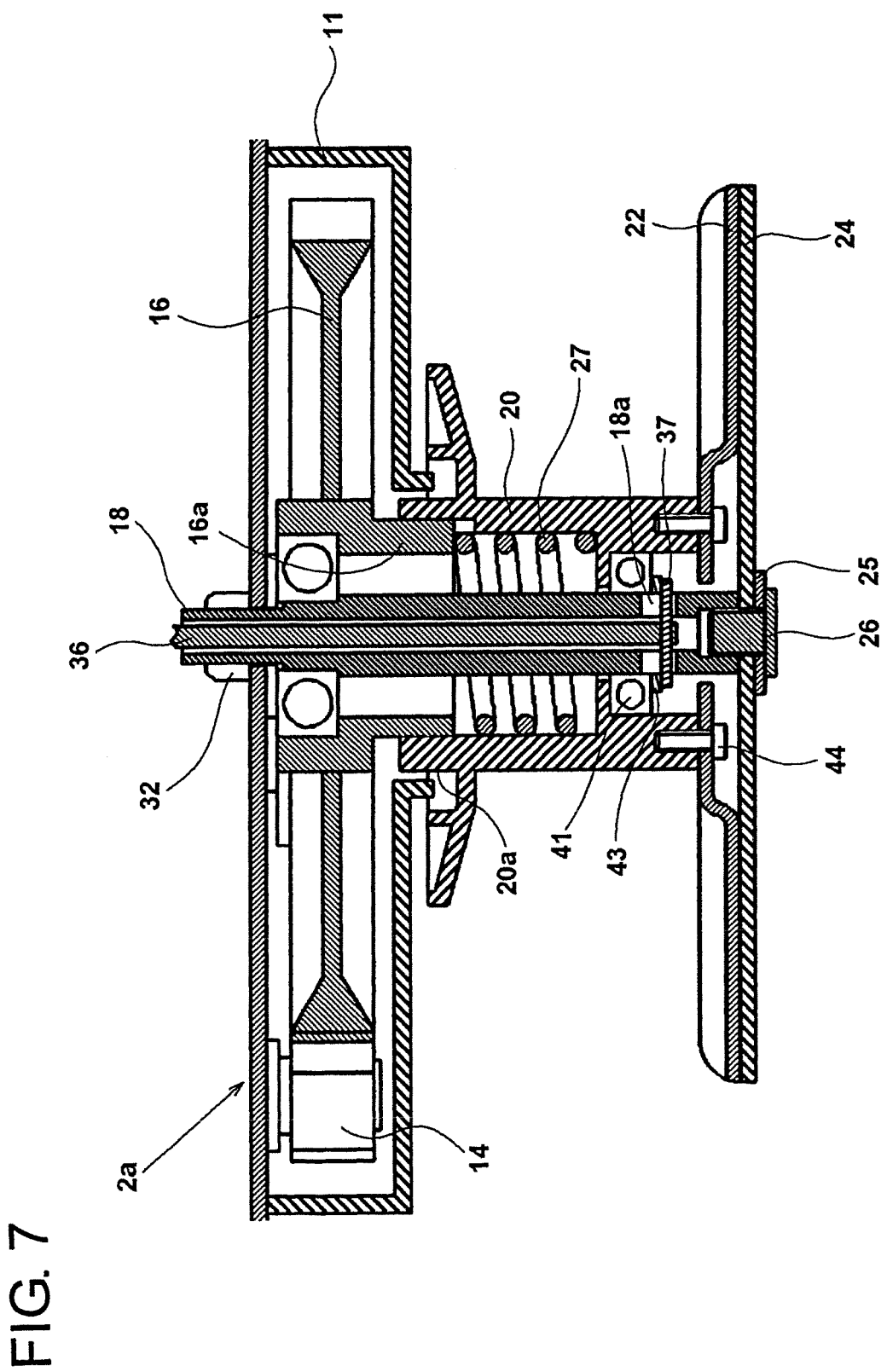
FIG. 7 is an enlarged sectional view of a region E, which is surrounded by a dotted line in FIG. 4 (a region peripheral to a second fixed shaft 18), in a state where a second rotary blade 22 and a second fixed blade 24 are in contact with each other.

FIG. 6 is a perspective view showing an attaching structure between the holder shaft 35 and the connector 40. A state where the operating lever 39 is removed from the connector 40 is shown in FIG. 6. A cylindrical projection 35b which projects in a radial direction is formed in a part of a region of the holder shaft 35 contacting with the connector 40. On the other hand, the connector 40 is provided with a groove 40a extending diagonally (spirally), and round holes 40b and 40c which are slightly larger than the projection 35b are formed at both ends of the groove 40a. Moreover, a cutout 40d is formed so as to extend downward from the hole 40c in the axial direction. The projection 35b is retained in either of the holes 40b and 40c through the groove 40a. In this occasion, axial positions of the operating lever 39 and the holder shaft 35 vary depending on which of the holes 40b and 40c the projection 35b is engaged with. When the projection 35b is positioned in the hole 40c, the second rotary blade 22 is pressed against the second fixed blade 24, as shown in FIG. 7. Meanwhile, when the projection 35b is positioned in the hole 40b, the holder shaft 35 is positioned upward, and the second rotary blade 22 is separated from the second fixed blade 24, as shown in FIG. 8 (or a pressing force is reduced).

FIG. 7 is an enlarged sectional view of a region E, which is surrounded by a dotted line in FIG. 4 (the region peripheral to the second fixed shaft 18), showing a state where the second rotary blade 22 is in contact with the second fixed blade 24. The second rod 36 passing through a space inside the second fixed shaft 18 is provided with a hole perpendicular to the axial direction, at its top end side, and a pin 37 is fixed so as to penetrate the hole. The pin 37 passes through a cutout 18a of the second fixed shaft 18, and an upper end of the pin 37 is brought into contact with a washer 43 which is in contact with a lower side of an inner ring of the bearing 41. The second rotation shaft 20 is rotatably supported the bearing 41 which is fixed to an outer periphery of the second fixed shaft 18. The second rotation shaft 20 is a holding member in a substantially cylindrical shape, and the second rotary blade 22 is fixed to a lower side of the second rotation shaft 20 with a plurality of screws 44. The second rotation shaft 20 is engaged with the engaging part 16a of the second gear 16 in such a manner that they are restrained from relative rotation in a circumferential direction, but can move in the axial direction. The engagement between them can be realized by a combination of a spline groove and an axially extending convex part. The spring 27 for pressing the second rotation shaft 20 downward with respect to the engaging part 16a with a determined force is interposed between them. The cutout 18a through which the pin 37 is passed has a determined length in the axial direction, and the second rod 36 is held so as to move in the axial direction (up and down direction). The second fixed blade 24 is attached to a lower part of the second fixed shaft 18 by means of the fixed blade holding member 25 and a fixed blade fitting bolt 26.

Figure 8:
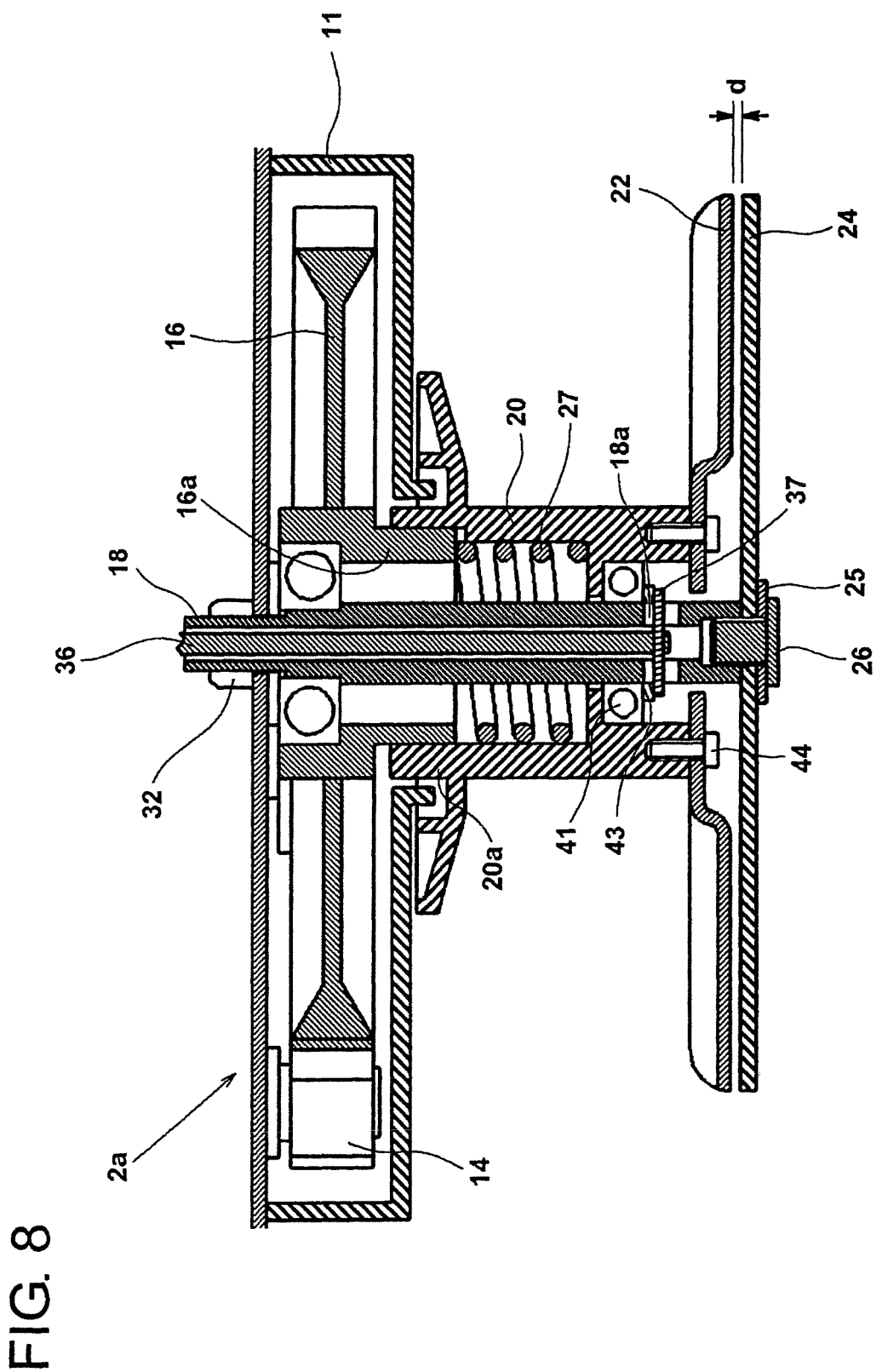
FIG. 8 is an enlarged sectional view of the region E, which is surrounded by the dotted line in FIG. 4 (the region peripheral to the second fixed shaft 18), in a state where the second rotary blade 22 and the second fixed blade 24 are separated from each other.
Figure 9:
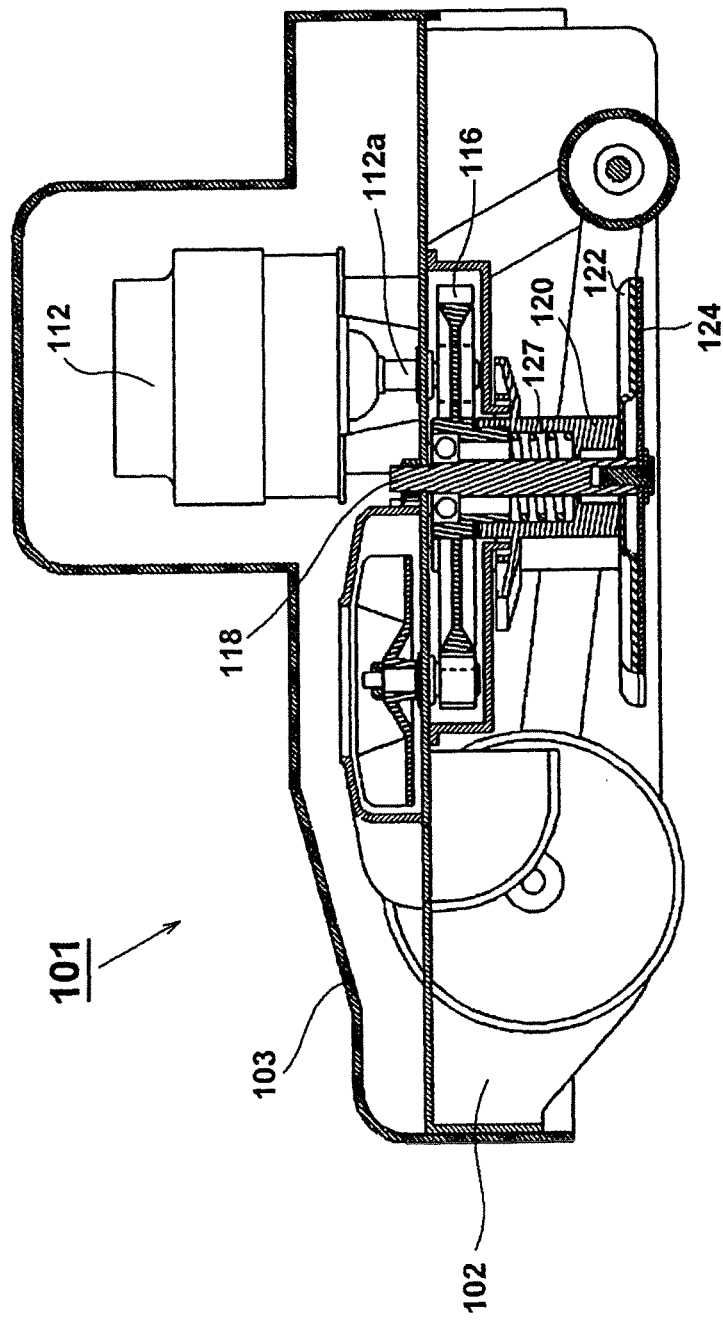
FIG. 9 is a sectional view showing a structure of a related-art lawn mower 101.

FIG. 8 is an enlarged sectional view of the region E, which is surrounded by the dotted line in FIG. 4 (the region surrounding the second fixed shaft 18), showing a state where the second rotary blade 22 is separated from the second fixed blade 24. In FIG. 7, a state where the operating lever 39 is operated, and the second rod 36 which is fixed to the holder shaft 35 and the holder 34 is moved upward, is shown. When the second rod 36 is pulled upwards, the bearing 41 is moved upward by the pin 37, and accordingly, the second rotation shaft 20 is moved upward. Because the second rotary blade 22 is fixed to the lower end of the second rotation shaft 20, the second rotary blade 22 is also moved upward. On the other hand, the second fixed blade 24 is fixed to the chassis 2 via the second fixed shaft 18 so as not to move. Therefore, when the second rotary blade 22 is moved upward, a distance "d" between the second rotary blade 22 and the second fixed blade 24 is made larger. It is to be noted that the distance "d" between the second rotary blade 22 and the second fixed blade 24 is exaggerated in FIG. 8, for making it easier to understand that the second rotary blade 22 is moved upward. However, the second rotary blade 22 is moved upward, only for reducing operating noise which occurs when the second rotary blade 22 and the second fixed blade 24 are rubbed against each other. Because the lawn or grass must be mown in this state, the distance between the second rotary blade 22 and the second fixed blade 24 may be set to such extent that cutting effects may not be inhibited.

Next, operation of the lawn mower 1 in the exemplary embodiment will be described. When the worker operates the switch mechanism 5, by connecting the power supply cable, which is not shown, to an outside power supply, which is not shown, the motor 12 is driven, and the first rotary blade 21 and the second rotary blade 22 are rotated. In this manner, it is possible to mow the lawn or grass in a manner as to cut it with the first rotary blade 21 and the first fixed blade 23, and between the second rotary blade 22 and the second fixed blade 24, like a scissor. Then, the airflow generated by the rotation of the air blowing fan 28 is supplied from the air blowing hole 31 provided on the lower face of the chassis 2 and the opening of the lower fan housing 30b, thereby collecting the lawn or grass which has been mown.

As the worker grasps the handle part 4 to push the lawn mower 1 to move, the work for mowing the lawn is conducted. In the lawn mower 1, a noise occurs when the first rotary blade 21 is rubbed against the first fixed blade 23, and the second rotary blade 22 is rubbed against the second fixed blade 24. When the worker rotates the operating lever 39, the holder shaft 35 is pulled up by the action of the projection 35b and the groove 40a, and then, the holder 34, the first rod (not shown), and the second rod 36 are moved upward. As a result, a small gap is formed between the second rotary blade 22 and the second fixed blade 24, as shown in FIG. 8, and the noise which occurs can be remarkably reduced. In case where the rotary blade is not in contact with the fixed blade, reduction of the noise can be achieved. By making the gap between the rotary blade and the fixed blade smaller than a diameter of the lawn, to be the distance d, for example, it is possible to realize low noise operation, while lawn mowing performance is secured. Moreover, particularly in case where a more favorable finish is desired, it is possible to work by keeping the rotary blade and the fixed blade in contact with each other. The worker can optionally select either of the cases.

Although the invention has been heretofore described referring to the exemplary embodiment, the invention is not limited to the above-described exemplary embodiment, but various modifications can be made within a scope not deviating from gist of the invention. For example, although in the above-described exemplary embodiment, the operating part 38 is constructed such that the second rotary blade 22 is moved by the projection 35b and the groove 40a, the operating part 38 may be constructed in such a manner that a male screw is provided to the holder shaft 35, while a female screw is provided to the connector 40. Thereby, by rotating the operating lever 39, it is possible to steplessly (continuously) regulate the gap between the second rotary blade 22 and the second fixed blade 24.

Moreover, pulling up the second rod 36 with a small motor or by an actuator by forming the second rod 36 by wire, can be also employed. The invention can be optionally modified within the scope not deviating from the gist of the invention. Further, the shapes of the edges of the fixed blades and the rotary blades, mechanism for rotating the rotary blades, the structure for attaching the rotary blades and the fixed blades to the chassis 2, and so on, are not limited to the above-described exemplary embodiment, but other structures may be adopted. Still further, although the power supply is an electric motor in the above-described exemplary embodiment, for example, an engine may also be used.

The present invention provides illustrative, non-limiting aspects as follows:

In a first aspect, there is provided a lawn mower including: a power supply; a chassis for holding the power supply; a fixed shaft attached to the chassis; a rotary blade which is rotatably supported with respect to the fixed shaft; a transmitting portion which transmits rotation of the power supply to the rotary blade; and a fixed blade which is coaxially-arranged with the rotary blade, wherein a distance between the rotary blade and the fixed blade can be varied.

According to the first aspect, because a distance (small gap) is formed between the rotary blade and the fixed blade, it is possible to remarkably decrease noises which occur when the rotary blade and the fixed blade are rubbed against each other.

In a second aspect, there is provided the lawn mower according to the first aspect, wherein the rotary blade and the fixed blade are arranged substantially parallel to the ground, and wherein the rotary blade is disposed above the fixed blade.

According to the second aspect, it is possible for a worker to select either of a "low noise mode" where the operating noise is reduced because the small gap is formed between the rotary blade and the fixed blade, and a "high cutting mode" where the rotary blade and the fixed blade are rubbed against each other thereby to enhance cutting performance.

In a third aspect, there is provided the lawn mower according to the first or second aspect, further including a positioning portion which is configured to vary a position of the rotary blade in an axial direction of the fixed shaft.

According to the third aspect, because the positioning portion for varying the position of the rotary blade in the axial direction of the fixed shaft is provided, the worker can perform the lawn mowing work in a state where the operating noise is reduced, by varying the position of the rotary blade. Moreover, in case where the rotary blade is not appropriately positioned and has no good edge, it is possible to improve the edge by varying the position of the rotary blade.

In a fourth aspect, there is provide the lawn mower according to the third aspect, wherein the positioning portion is configured to set the position of the rotary blade in at least a first position and a second position, wherein in the first position, the rotary blade strongly contacts with the fixed blade, and wherein in the second position, the rotary blade weakly contacts with the fixed blade or does not contact with the fixed blade.

According to the fourth aspect, because the positioning portion can set the position of the rotary blade to at least two positions, the worker can select either of the working mode where the good edge is preferred, and the working mode where decrease of the operating noise is preferred.

In a fifth aspect, there is provided the lawn mower according to the fourth aspect, wherein the fixed shaft is a hollow member through which a rod penetrates, wherein the position of the rotary blade in the axial direction of the fixed shaft is determined by the rod, and wherein a position of the rod in an axial direction thereof is determined by the positioning portion.

According to the fifth aspect, the rod penetrates through the fixed shaft, and the position of the rotary blade in the axial direction is determined by the movement of the rod. Therefore, it is possible to move only the rotary blade, without changing a mowing height (a distance between the fixed blade and the ground).

In a sixth aspect, there is provided the lawn mower according to the fifth aspect, wherein the positioning portion includes an operating lever, and wherein the operating lever is provided at a position operable from an outside of a cover which covers the chassis.

According to the sixth aspect, the positioning portion includes the operating lever operable from the outside of the cover which covers the chassis. Therefore, the worker can change the position of the rotary blade in the axial direction during the operation, and operability is enhanced.

In a seventh aspect, there is provided the lawn mower according to the sixth aspect, wherein a plurality of pairs, each of which including the rotary blade and the fixed blade, are arranged in a lateral direction.

According to the seventh aspect, because a plurality of pairs of the rotary blade and the fixed blade are arranged in the lateral direction, a large mowing width can be secured. Therefore, it is possible to realize the lawn mower having enhanced mowing efficiency.

In an eighth aspect, there is provided the lawn mower according to the seventh aspect, wherein the rotary blades included in the plurality of pairs are moved in the axial direction of the fixed shaft by operating the operating lever.

According to the eighth aspect, because the rotary blades included in the plurality of pairs can be simultaneously and synchronously moved in the axial direction, it is possible to realize the lawn mower having excellent operability.

In a ninth aspect, there is provided the lawn mower according to any one of the first to eighth aspect, further including an elastic member which presses the rotary blade toward the fixed blade.

According to the ninth aspect, because there is provided the elastic member for pressing the rotary blade toward the fixed blade, it is possible to restrain deformation of the rotary blade and a shock against the gear, when twigs or leaves are caught between the rotary blade and the fixed blade.

What is claimed is:

1. A lawn mower comprising:
a power supply;
a chassis for holding the power supply;
a fixed shaft attached to the chassis;
a rotary blade which is rotatably supported with respect to the fixed shaft;
a transmitting portion which transmits rotation of the power supply to the rotary blade;
a fixed blade which is coaxially-arranged with the rotary blade;
an elastic member which presses the rotary blade toward the fixed blade; and
a positioning portion which is configured to:
vary a position of the rotary blade relative to the fixed blade in an axial direction of the fixed shaft, and
regulate movement of the rotary blade toward a biasing direction of the elastic member at a plurality of positions, wherein:
a distance between the rotary blade and the fixed blade can be varied by operating the positioning portion,
the positioning portion is configured to set the position of the rotary blade in at least a first position and a second position,
in the first position, the rotary blade strongly contacts with the fixed blade, and
in the second position, the rotary blade weakly contacts with the fixed blade or does not contact with the fixed blade,
the fixed shaft is a hollow member through which a rod penetrates, and a part of the rod is connected to the positioning portion,
the position of the rotary blade in the axial direction of the fixed shaft is determined by the rod, and
a position of the rod in an axial direction thereof is determined by the positioning portion.

2. The lawn mower according to claim 1,
wherein the rotary blade and the fixed blade are arranged substantially parallel to the ground, and
wherein the rotary blade is disposed above the fixed blade.

3. The lawn mower according to claim 1,
wherein the positioning portion includes an operating lever, and wherein the operating lever is provided at a position operable from an outside of a cover which covers the chassis.

4. The lawn mower according to claim 3,
wherein a plurality of pairs, each of which including the rotary blade and the fixed blade, are arranged in a lateral direction.

5. The lawn mower according to claim 4,
wherein the rotary blades included in the plurality of pairs are moved in the axial direction of the fixed shaft by operating the operating lever.

* * * * *